US009592486B2

(12) United States Patent
Sato

(10) Patent No.: US 9,592,486 B2
(45) Date of Patent: Mar. 14, 2017

(54) OLEFIN POLYMERIZER, POLYOLEFIN PRODUCTION SYSTEM, AND PROCESS FOR PRODUCING POLYOLEFIN

(71) Applicant: SUMITOMO CHEMICAL COMPANY, LIMITED, Tokyo (JP)

(72) Inventor: Hideki Sato, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 85 days.

(21) Appl. No.: 14/401,029

(22) PCT Filed: May 1, 2013

(86) PCT No.: PCT/JP2013/062712
§ 371 (c)(1),
(2) Date: Nov. 13, 2014

(87) PCT Pub. No.: WO2013/172204
PCT Pub. Date: Nov. 21, 2013

(65) Prior Publication Data
US 2015/0141589 A1 May 21, 2015

(30) Foreign Application Priority Data
May 14, 2012 (JP) ................................. 2012-110934

(51) Int. Cl.
B01J 8/24 (2006.01)
C08F 2/01 (2006.01)
C08F 110/06 (2006.01)

(52) U.S. Cl.
CPC ................. B01J 8/245 (2013.01); C08F 2/01 (2013.01); B01J 2208/06 (2013.01); C08F 110/06 (2013.01)

(58) Field of Classification Search
CPC ........... C08F 2/01; B01J 8/245; B01J 2208/06
(Continued)

(56) References Cited

U.S. PATENT DOCUMENTS

2009/0148354 A1 6/2009 Ogawa et al.
2009/0149610 A1* 6/2009 Sato ........................ C08F 10/00
526/65
2010/0311923 A1 12/2010 Sato et al.

FOREIGN PATENT DOCUMENTS

JP 2008-120883 A 5/2008
JP 2009-161734 A 7/2009
(Continued)

OTHER PUBLICATIONS

International Search Report (Form PCT/ISA/210) for International Application No. PCT/JP2013/062712, dated Jun. 11, 2013.
(Continued)

Primary Examiner — Fred M Teskin
(74) Attorney, Agent, or Firm — Birch, Stewart, Kolasch & Birch, LLP

(57) ABSTRACT

An olefin polymerization reactor comprising a tubular portion that extends in a vertical direction; a tapered portion disposed inside the tubular portion, an inside diameter of the tapered portion decreasing downwardly, and including a vertically penetrating orifice at a bottom end thereof; a tubular lower deflector disposed above the orifice of the tapered portion, an outside diameter of the tubular lower deflector increasing downwardly, a bottom end thereof being located away from an inner wall of the tubular portion, and including a vertically penetrating orifice at a top end thereof; and an upper deflector disposed above the orifice of the lower deflector, an outside diameter of the upper deflector increasing downwardly, a top end thereof being closed, a bottom end thereof being located away from the inner wall of the tubular portion, and an outside diameter at the bottom end being equal to or greater than an inside diameter of the orifice of the lower deflector.

20 Claims, 4 Drawing Sheets

(58) Field of Classification Search
USPC .......................................................... 422/134
See application file for complete search history.

(56) References Cited

FOREIGN PATENT DOCUMENTS

| JP | 2010-280867 A | 12/2010 |
|----|---------------|---------|
| JP | 2010-280869 A | 12/2010 |
| JP | 2010-280870 A | 12/2010 |

OTHER PUBLICATIONS

International Preliminary Report on Patentability and English translation of the Written Opinion of the International Searching Authority (Forms PCT/IB/338, PCT/IB/373 and PCT/ISA/237), issued Nov. 27, 2014, for International Application No. PCT/JP2013/062712.

Chinese Office Action and Search Report for Chinese Application No. 201380025368.7, dated May 26, 2015, with an English translation.

An Office Action (including an English translation) issued in the corresponding Japanese Patent Application No. 2012-110934 on Aug. 18, 2015.

* cited by examiner

US 9,592,486 B2

OLEFIN POLYMERIZER, POLYOLEFIN PRODUCTION SYSTEM, AND PROCESS FOR PRODUCING POLYOLEFIN

TECHNICAL FIELD

The present invention relates to an olefin polymerization reactor and a polyolefin production system that internally form a spouted bed of polyolefin particles to polymerize olefins, and a process for producing polyolefins such as polyethylene and polypropylene using the same.

BACKGROUND ART

A spouted bed type olefin polymerization reactor as described in Patent Literature 1 is known. In this polymerization reactor, a deflector is used to restrain scattering of polyolefin particles from the spouted bed.

CITATION LIST

Patent Literature

Patent Literature 1: Japanese Patent Application Laid-Open Publication No. 2009-161735

SUMMARY OF INVENTION

Technical Problem

An examination made by the present inventors revealed a possibility that polyolefin particles might adhere to an outer surface (top surface) of a deflector depending on operating conditions when operation continues for an extended period of time. When polyolefin particles adhere to the surface of the deflector and grow, and the lump of grown polyolefin particles is separated from the surface of the deflector and falls down, the flow of the spouted bed therebelow may become unstable.

The present invention has been implemented to solve the above-described problem, and it is an object of the present invention to provide an olefin polymerization reactor and the like capable of preventing particles from adhering to the outer surface (top surface) of the deflector.

Solution to Problem

An olefin polymerization reactor according to the present invention includes a tubular portion that extends in a vertical direction; a tapered portion disposed inside the tubular portion, an inside diameter of the tapered portion decreasing downwardly, and including a vertically penetrating orifice at a bottom end thereof; a tubular lower deflector disposed above the orifice of the tapered portion, an outside diameter of the tubular lower deflector increasing downwardly and a bottom end thereof being located away from an inner wall of the tubular portion, and including a penetrating orifice from a top end to the bottom end along a central axis which extends in a vertical direction; and an upper deflector disposed above the orifice of the lower deflector, an outside diameter of the upper deflector increasing downwardly, a top end thereof being closed, a bottom end thereof being located away from the inner wall of the tubular portion, and an outside diameter at the bottom end being equal to or greater than an inside diameter of the orifice of the lower deflector.

In the olefin polymerization reactor of the present invention, polyolefin particles containing a catalyst are supplied onto an inner surface of the tapered portion, an olefin-containing gas is made to flow at high velocities upward from the orifice at the bottom end of the tapered portion and it is possible to form a spouted bed of polyolefin particles within a reaction region surrounded by an inner surface of the tapered portion and an inner surface of the tubular portion above the tapered portion. Here, the spouted bed refers to a state of a particle bed composed of polyolefin particles (hereinafter, simply referred to as "particles" depending on the case) due to action of the olefin-containing gas from a gas introducing orifice, in which a spout (jet portion) is formed in the vicinity of a center axis of the tubular portion through which particles having a sparse particle concentration flow upward together with the gas, and around which a annular structure is formed in which particles descend in a moving bed form under the influence of gravity, producing circular motion of particles.

Part of the olefin-containing gas blown from a gas introducing orifice 30o fauns a spout, passes through the particle bed and the rest is scattered in the part of the particle bed of the annular structure. Thus, the olefin-containing gas and polyolefin particles come into solid/gas contact with each other and polyolefin particles thereby grow by polymerization of olefin in the reaction region.

Compared to a fluidized bed, the spouted bed is generally known to exhibit excellent performance in terms of pressure loss and produce a mixing similar to a plug flow to some extent through circular motion of particles. Therefore, the olefin polymerization reactor according to the present invention has an advantage that a particle retention time distribution in the reaction region can be reduced. Furthermore, the spouted bed enables flowing of particles at a low gas flow rate compared to the fluidized bed even when producing relatively large-sized polyolefin particles on the order of several mm in diameter which would require an excessive gas flow rate for flowing in the case of the fluidized bed.

The polymerization reactor of the present invention provides the upper deflector and the lower deflector, and can thereby restrain scattering of particles from the spouted bed upward. Therefore, it is possible to reduce a free board zone of the tubular portion and achieve higher volume efficiency than a fluidized bed type apparatus.

Moreover, the present invention restrains adhesion of particles to the outer surface (top surface) of the lower deflector. This may be attributable to the fact that the course of particles exiting from the orifice of the lower deflector upward is changed by the upper deflector and discharged outward through the gap between the upper deflector and the lower deflector along the outer surface (top surface) of the lower deflector.

Here, the bottom end of the upper deflector may be located below the top end of the lower deflector. On the other hand, the bottom end of the upper deflector may be located above the top end of the lower deflector.

The inside diameter of the orifice of the lower deflector is preferably 0.5 to 2.0 times the inside diameter of the orifice of the tapered portion.

The outside diameter at the bottom end of the upper deflector is preferably equal to or less than 3 times the inside diameter of the orifice of the lower deflector.

The outside diameter at the bottom end of the lower deflector is preferably 0.35 to 0.65 times the inside diameter of the tubular portion.

The inside diameter of the orifice of the tapered portion is preferably equal to or less than 0.35 times the inside diameter of the tubular portion. The polymerization reactor may further comprise a straight pipe that extends upward in the vertical direction, provided at the top end of the lower deflector. The polymerization reactor may also further comprise a straight pipe that extends downwardly in the vertical direction, provided at the bottom end of the upper deflector.

It is preferable to further comprise an olefin supply section that causes liquid olefin to contact the outer surface (top surface) of the upper deflector. This allows the outer surface (top surface) of the upper deflector to be cleaned and also restrains adhesion of particles to the outer surface (top surface) of the upper deflector. The area of the outer surface (top surface) of the upper deflector is preferably smaller than the area of the outer surface (top surface) of the lower deflector.

It is preferable to comprise a plurality of combinations of the tubular portion, tapered portion, lower deflector and upper deflector. This allows multi-stage polymerization.

The above-described plurality of combinations are preferably arranged in the vertical direction.

It is now preferable to further comprise transporting means for transporting polyolefin particles from one combination to another combination.

The angle of inclination formed by the outer surface of the lower deflector with respect to the horizontal plane is preferably greater than an angle of repose of polyolefin particles inside the cylinder. Moreover, the angle of inclination formed by the outer surface of the upper deflector with respect to the horizontal plane is preferably greater than the angle of repose of polyolefin particles inside the cylinder. These prevent polyolefin particles from adhering to each deflector.

The outer surface of the upper deflector is preferably a conical surface.

The outer surface of the lower deflector preferably forms part of a conical surface.

A process for producing polyolefin of the present invention forms a spouted bed of polyolefin particles on the tapered portion in the above-described polymerization reactor to polymerize olefin.

Another invention of the present invention comprises a step of continuously supplying olefin to the above-described olefin polymerization reactor, continuously extracting a gas containing unreacted olefin from the olefin polymerization reactor and sending the extracted gas back to the olefin polymerization reactor, a step of cooling all or part of the extracted gas to obtain an olefin-containing condensate, and a step of supplying the condensate to the outer surface (top surface) of the upper deflector.

A polyolefin production system of the present invention comprises an olefin pre-polymerization reactor that polymerizes olefin in the presence of an olefin polymerization catalyst to form polyolefin particles, and the above-described olefin polymerization reactor connected downstream of the olefin pre-polymerization reactor.

Another process for producing polyolefin of the present invention polymerizes olefin using the above-described polyolefin production system.

Advantageous Effects of Invention

According to the present invention, it is possible to restrain adhesion of particles to the outer surface (top surface) of the deflector more easily.

DESCRIPTION OF EMBODIMENTS

Figure 1:
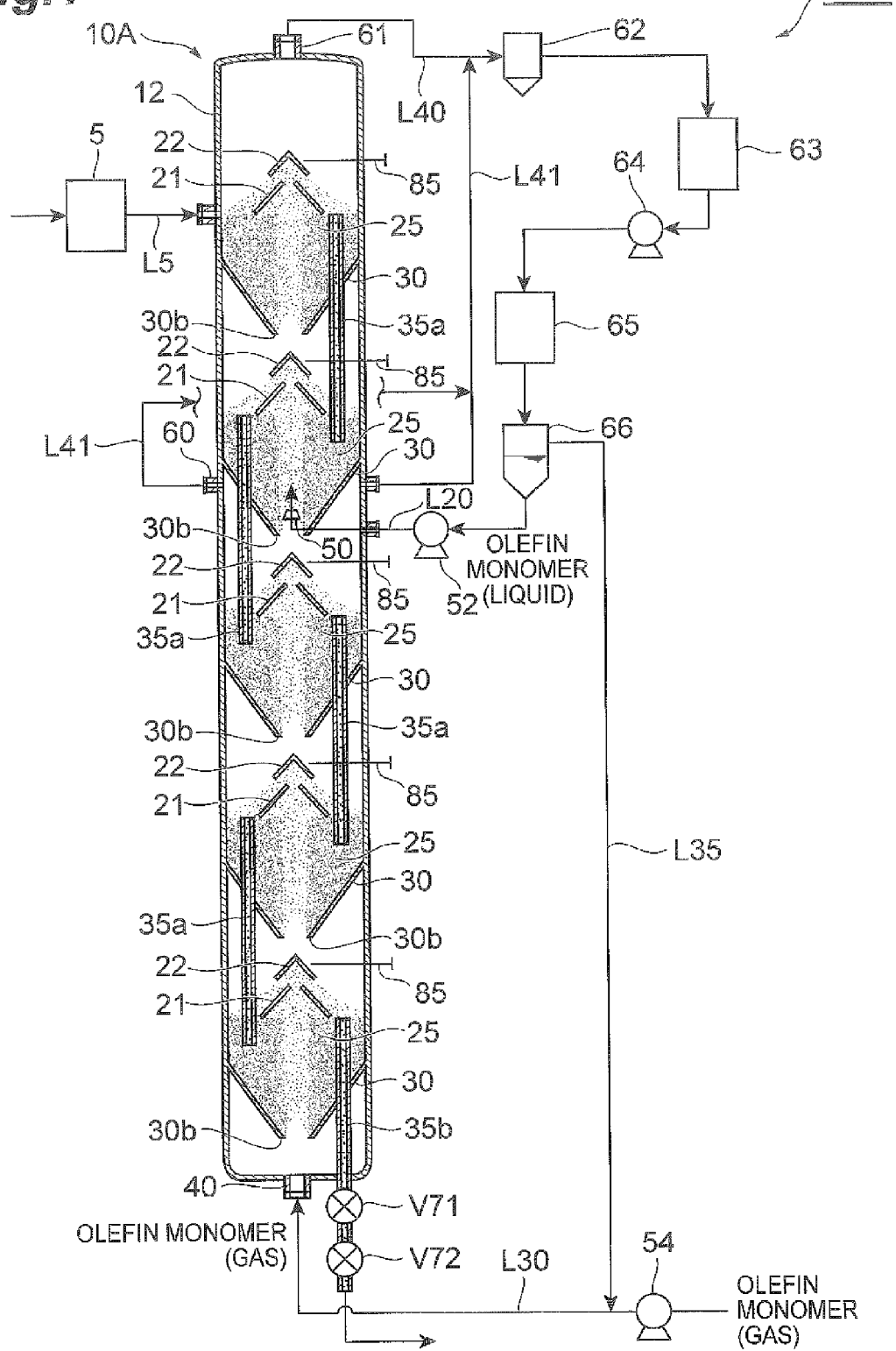
FIG. 1 is a schematic configuration diagram illustrating an embodiment of a polyolefin production system according to the present invention.

Hereinafter, preferred embodiments of the present invention will be described in detail with reference to the accompanying drawings as required. Positional relationships such as top and bottom, left and right are assumed to be based on positional relationships shown in the drawings unless otherwise specified. Moreover, dimensional ratios in the drawings are not limited to the ratios illustrated in the drawings.

(Polyolefin Production System)

FIG. 1 illustrates a polyolefin production system 100A according to the present embodiment. This production system 100A includes an olefin pre-polymerization reactor 5 and an olefin polymerization reactor 10A connected downstream of this olefin pre-polymerization reactor 5.

(Olefin Pre-Polymerization Reactor)

The olefin pre-polymerization reactor 5 polymerizes olefin in the presence of an olefin polymerization catalyst to form polyolefin particles.

The olefin pre-polymerization reactor 5 is not particularly limited, but examples of the olefin pre-polymerization reactor 5 include slurry polymerization reactor, bulk polymerization reactor, stirred tank type vapor phase polymerization reactor, and fluidized-bed type vapor phase polymerization reactor. When olefin is pre-polymerized, one of these polymerization reactors may be used singly or a plurality of polymerization reactors of the same type may be used in combination or two or more polymerization reactors of different types may be used in combination.

As the slurry polymerization reactor, a publicly known polymerization reactor, for example, a stirred tank type polymerization reactor or loop type polymerization reactor described in Japanese Examined Patent Application Publication No. S41-12916, Japanese Examined Patent Application Publication No. S46-11670, Japanese Examined Patent Application Publication No. S47-42379 can be used. Note that slurry polymerization is a method for performing polymerization conducted in a state in which an olefin monomer such as propylene, butene is added to an inert solvent of aliphatic carbon hydride such as propane, butane, isobutane, pentane, hexane, heptane, octane or alicyclic family carbon hydride such as cyclopentane, cyclohexane, the resultant product is used as a polymerization solvent, an olefin polymerization catalyst is scattered in the polymerization solvent in a slurry form so that the resultant polymer is not dissolved in the polymerization solvent. Polymerization is performed while keeping the polymerization solvent in a liquid state, and at a temperature and pressure at which the polymer generated is not dissolved in the polymerization solvent. The polymerization temperature is normally 30 to 100° C. and preferably 50 to 80° C. The polymerization pressure is normally normal pressure to 10 MPaG and preferably 0.3 to 5 MPaG.

As the bulk polymerization reactor, a publicly known polymerization reactor, for example, a stirred tank type polymerization reactor or loop type polymerization reactor described in Japanese Examined Patent Application Publication No. S41-12916, Japanese Examined Patent Application Publication No. S46-11670, Japanese Examined Patent Application Publication No. S47-42379 can be used. Note that bulk polymerization is a method for performing polymerization in a state in which no inert solvent of aliphatic carbon hydride such as propane, butane, isobutane, pentane, hexane, heptane, octane or alicyclic family carbon hydride such as cyclopentane, cyclohexane substantially exists, an olefin monomer such as propylene, butene is used as a polymerization solvent, an olefin polymerization catalyst is scattered in the polymerization solvent, and the resultant polymer is not dissolved in the polymerization solvent. Polymerization is performed while keeping the polymerization solvent in a liquid state, and at a temperature and pressure at which the polymer generated is not dissolved in the polymerization solvent. The polymerization temperature is normally 30 to 100° C. and preferably 50 to 80° C. The polymerization pressure is normally normal pressure to 10 MPaG and preferably 0.5 to 5 MPaG.

As the stirred tank type vapor phase polymerization reactor, a publicly known polymerization reactor, for example, a polymerization reactor described in Japanese Patent Application Laid-Open Publication No. S46-31969, or Japanese Examined Patent Application Publication No. S59-21321 can be used.

Note that stirred tank type vapor phase polymerization is a method for polymerizing a monomer in a gas state using the monomer in the gas state as a medium while keeping an olefin polymerization catalyst and olefin polymer in the medium in a flowing state using an agitator. The polymerization temperature is normally 50 to 110° C., and preferably 60 to 100° C. The polymerization pressure needs only to fall within a range in which olefin can exist in a vapor phase inside a stirred tank type vapor phase polymerization reactor, and is normally normal pressure to 5 MPaG, and preferably 0.5 to 3 MPaG.

As the fluidized-bed type vapor phase polymerization reactor, a publicly known polymerization reactor, for example, a polymerization reactor described in Japanese Patent Application Laid-Open Publication No. S58-201802, Japanese Patent Application Laid-Open Publication No. S59-126406, or Japanese Patent Application Laid-Open Publication No. H2-233708 can be used. Note that fluidized-bed type vapor phase polymerization is a method for polymerizing a monomer in a gas state using the monomer in the gas state as a medium while keeping an olefin polymerization catalyst and olefin polymer in the medium in a flowing state mainly through a flow of the medium. An agitation apparatus may also be provided in an auxiliary way to promote fluidization. The polymerization temperature is normally 0 to 120° C., and preferably 20 to 100° C., and more preferably 40 to 100° C. The polymerization pressure needs only to fall within a range in which olefin can exist as a vapor phase inside the fluidized-bed type polymerization reactor, and is normally normal pressure to 10 MPaG, more preferably 0.2 to 8 MPaG, and further preferably 0.5 to 5 MPaG.

An example of a combination of the respective polymerization reactors is a fluidized-bed type vapor phase polymerization reactor or stirred tank type vapor phase polymerization reactor connected downstream of a slurry polymerization reactor or bulk polymerization reactor.

A flushing tank for separating unreacted olefin or a polymerization solvent from olefin polymer particles is provided as required between the slurry polymerization reactor or bulk polymerization reactor and a vapor phase polymerization reactor connected downstream thereof such as a fluidized-bed type vapor phase polymerization reactor, stirred tank type vapor phase polymerization reactor or an olefin polymerization reactor 10A which will be described later.

(Olefin Polymerization Reactor)

The olefin polymerization reactor 10A is an apparatus that supplies gas-state olefin to polyolefin particles generated by the olefin pre-polymerization reactor 5 to cause them to perform polymerization reaction.

As shown in FIG. 1, the olefin polymerization reactor 10A mainly includes a cylinder (tubular portion) 12 that extends in the vertical direction, a plurality of lower deflectors 21 provided in the cylinder 12, a plurality of upper deflectors 22, and a plurality of cylindrical baffles (tapered portions) 30. The upper deflectors 22, lower deflectors 21, and cylindrical baffles 30 are repeatedly arranged in that order in the cylinder 12. The upper deflectors 22, lower deflectors 21, and cylindrical baffles 30 are preferably arranged coaxially with the axis of the cylinder 12. An inside diameter D0 of the cylinder 12 is preferably 5 m or less or more preferably 3.5 m or less from a standpoint of stabilization of a spouted bed.

The cylindrical baffle 30 is a tapered cylinder whose inside diameter decreases downwardly, and a top end 30a of which is in contact with an inner wall of the cylinder 12. This causes a gas to flow upward from a circular gas introducing orifice 30o of a bottom end 30b and not to flow from between the top end 30a and the cylinder 12. The gas introducing orifice 30o formed at the bottom end 30b may be provided with a check valve (not shown) to prevent polyolefin particles in the reaction region 25 from flowing downwardly from the gas introducing orifice 30o when operation of the olefin polymerization reactor 10A is started or paused or the like. Here, the diameter of the orifice 30o of the cylindrical baffle 30 is assumed to be D1.

In the olefin polymerization reactor 10A in FIG. 1, five reaction regions 25 are formed so as to vertically align in the cylinder 12. The reaction region 25 is a region enclosed by the outer surface of the cylindrical baffle 30, the inner surface of the cylindrical baffle 30 immediately therebelow and the inner surface of the portion of the cylinder 12 between these parts (tubular portion). However, the top-stage reaction region 25 is a region enclosed by the inner surface of the top surface of the cylinder 12, the inner surface of the cylindrical baffle 30 immediately therebelow and the inner surface of the portion of the cylinder 12 between these parts (tubular portion).

In each reaction region 25, an olefin-containing gas flows upward at a high speed from the gas introducing orifice 30o formed at the bottom end 30b of the cylindrical baffle 30 and a spouted bed of polyolefin particles is thereby formed.

Figure 2:
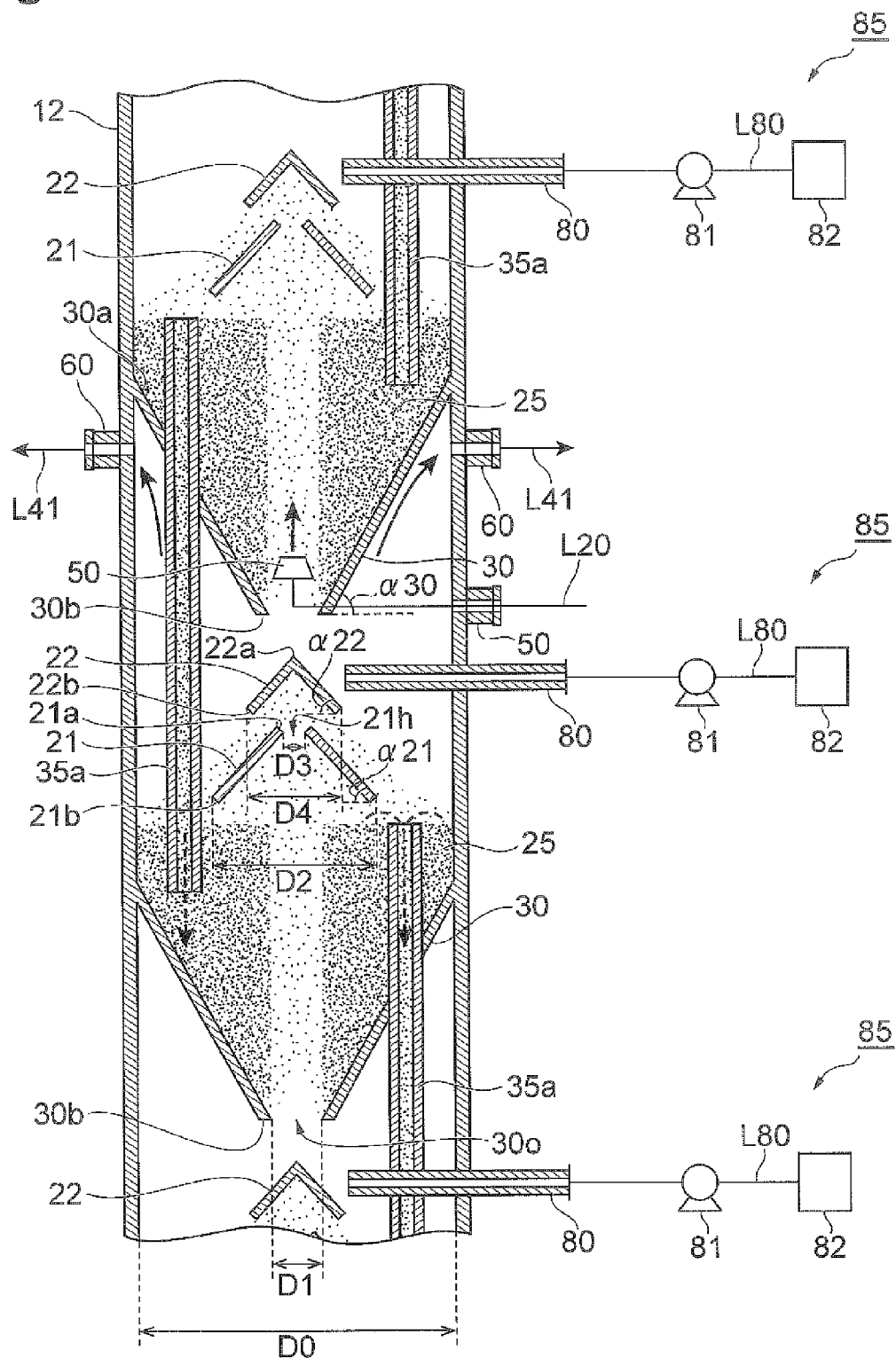
FIG. 2 is an enlarged schematic cross-sectional view of the olefin polymerization reactor 10A in FIG. 1.

As shown in FIG. 2, the lower deflector 21 and the upper deflector 22 are disposed at positions above the cylindrical baffle 30 of each reaction region 25 and facing the gas introducing orifice 30o thereof. The lower deflector 21 and the upper deflector 22 play the role of preventing polyolefin particles from scattering upward from the spouted bed. That is, particles coming out of the spouted bed collide with the lower deflector 21 and the upper deflector 22, thus preventing these particles from moving toward the upper reaction region. This shortens the free board zone and achieves high volume efficiency.

The lower deflector 21 has a tapered cylindrical shape and is disposed above the orifice 30o of the cylindrical baffle 30. The lower deflector 21 has a shape whose outside diameter increases downwardly. A bottom end 21b thereof is located apart from the inner wall of the cylinder 12 and the cylindrical baffle 30. The lower deflector 21 has an orifice 21h vertically penetrating along its central axis at a top end 21a thereof. In the present embodiment, the outer surface of the lower deflector 21 forms part of a conical surface. The inside diameter of the orifice 21h is assumed to be D3 here. The outside diameter at the bottom end 21b of the lower deflector 21 is assumed to be D2. The inside diameter of the orifice 21h refers to the inside diameter of a portion corresponding to a minimum horizontal cross-sectional area of the orifice. The outside diameter at the bottom end refers to the diameter of a portion where the contour has a maximum horizontal cross-sectional area. The diameter in the present Description when the cross section is not a circle is defined by the diameter of a circle having the same area as that of the cross section.

The upper deflector 22 is disposed above the orifice 21h of the lower deflector 21. The upper deflector 22 has a shape whose outside diameter increases downwardly, with a top end 22a thereof being closed. The bottom end 22b is located away from the inner wall of the cylinder 12 and the lower deflector 21. The outside diameter at the bottom end 22b is assumed to be D4. The outside diameter D4 at the bottom end 22b is greater than an inside diameter D3 at the top end of the orifice 21h of the lower deflector 21. The diameter of the inner surface of the upper deflector 22 preferably increases downwardly. In the present embodiment, the upper deflector 22 has a hollow conical shape, a bottom end of which is open.

The inside diameter D3 of the orifice 21h of the lower deflector 21 is preferably 0.5 to 2.0 times the inside diameter D1 of the orifice 30o of the cylindrical baffle 30.

The outside diameter D4 of the upper deflector 22 at the bottom end 22b is preferably within 3 times the inside diameter D3 of the orifice 21h of the lower deflector 21.

The outside diameter D2 of the lower deflector 21 at the bottom end 21b is preferably greater than the inside diameter D1 of the orifice 30o of the cylindrical baffle 30. The outside diameter D2 is preferably 0.35 to 0.65 times the inside diameter D0 of the cylinder 12 in order to prevent particles from scattering upward from outside the lower deflector 21.

The inside diameter D1 of the orifice 30o of the cylindrical baffle 30 is preferably equal to or less than 0.35 times the inside diameter D0 of the cylinder 12.

In the present embodiment, the bottom end 22b of the upper deflector 22 is located above the top end 21a of the lower deflector 21. The distance between the bottom end 22b of the upper deflector 22 and the top end 21a of the lower deflector 21 in the vertical direction is preferably equal to or less than the inside diameter D3 of the orifice 21h of the lower deflector 21. When this distance is too large, particles may not collide with the upper deflector 22 depending on the velocity of the gas.

Regarding the installation location of the lower deflector 21, the lower deflector 21 is preferably set so that the whole lower deflector 21 is exposed above the top surface of the spouted bed, and the bottom end is more preferably located away from the top surface of the spouted bed at a distance 0.5 to 1.5 times the inside diameter D0 of the cylinder 12. The position of the top surface of the spouted bed is controlled by the position of a down corner pipe 35a which will be described later, and operation conditions of particle supply and discharge means such as an ejector.

In the present embodiment, some particles blown up from the spouted bed collide with the inner surface (undersurface) of the lower deflector 21, then move downwardly and are recaptured into the annular structure of the spouted bed. Some other particles blown up from the spouted bed pass through the orifice 21h of the lower deflector 21, collide with the inner surface (undersurface) of the upper deflector 22, are discharged laterally outward from the gap between the lower deflector 21 and the upper deflector 22, moved along the outer surface (top surface) of the lower deflector 21 and then recaptured by the annular structure of the spouted bed. This prevents adhesion or deposition of particles on the surface of the lower deflector 21.

On the other hand, most of the gas passes through the gap between the bottom end 21b of the lower deflector 21 and the inner wall of the cylinder 12 and moves upward, whereas part of the gas passes through the orifice 21h of the lower deflector 21, is discharged from the gap between the lower deflector 21 and upper deflector 22 and then moves upward.

Figure 3:
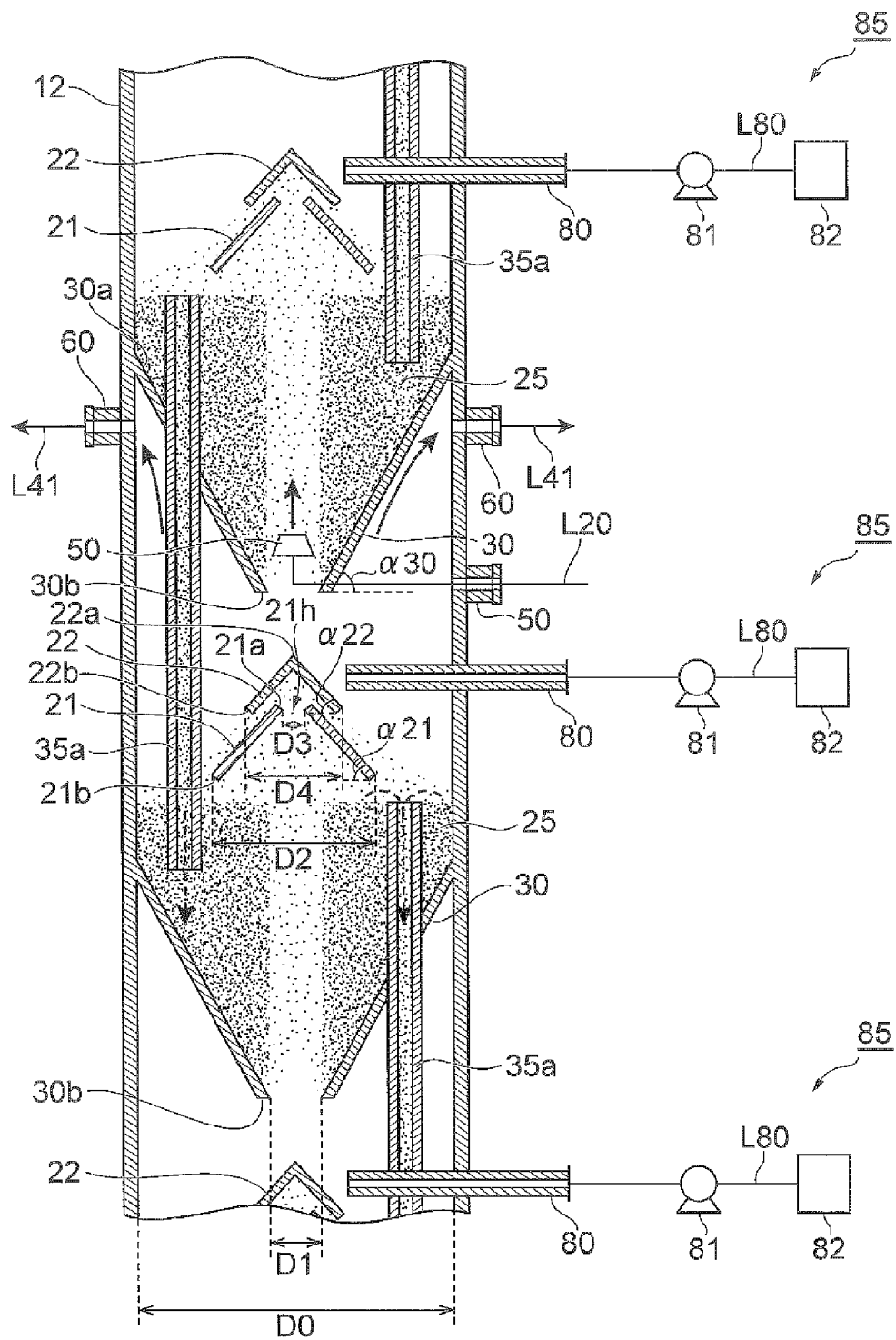
FIG. 3 is a schematic configuration diagram illustrating another embodiment of the polyolefin production system according to the present invention.

The shape and location of the upper deflector 22 and the lower deflector 21 are not limited to the above-described ones. For example, as shown in FIG. 3, the bottom end 22b of the upper deflector 22 may be located below the top end 21a of the lower deflector 21. In this case, the minimum distance between the upper deflector 22 and the lower deflector 21 is preferably secured to be equal to or greater than 10 times the diameter of particles.

Figure 4:
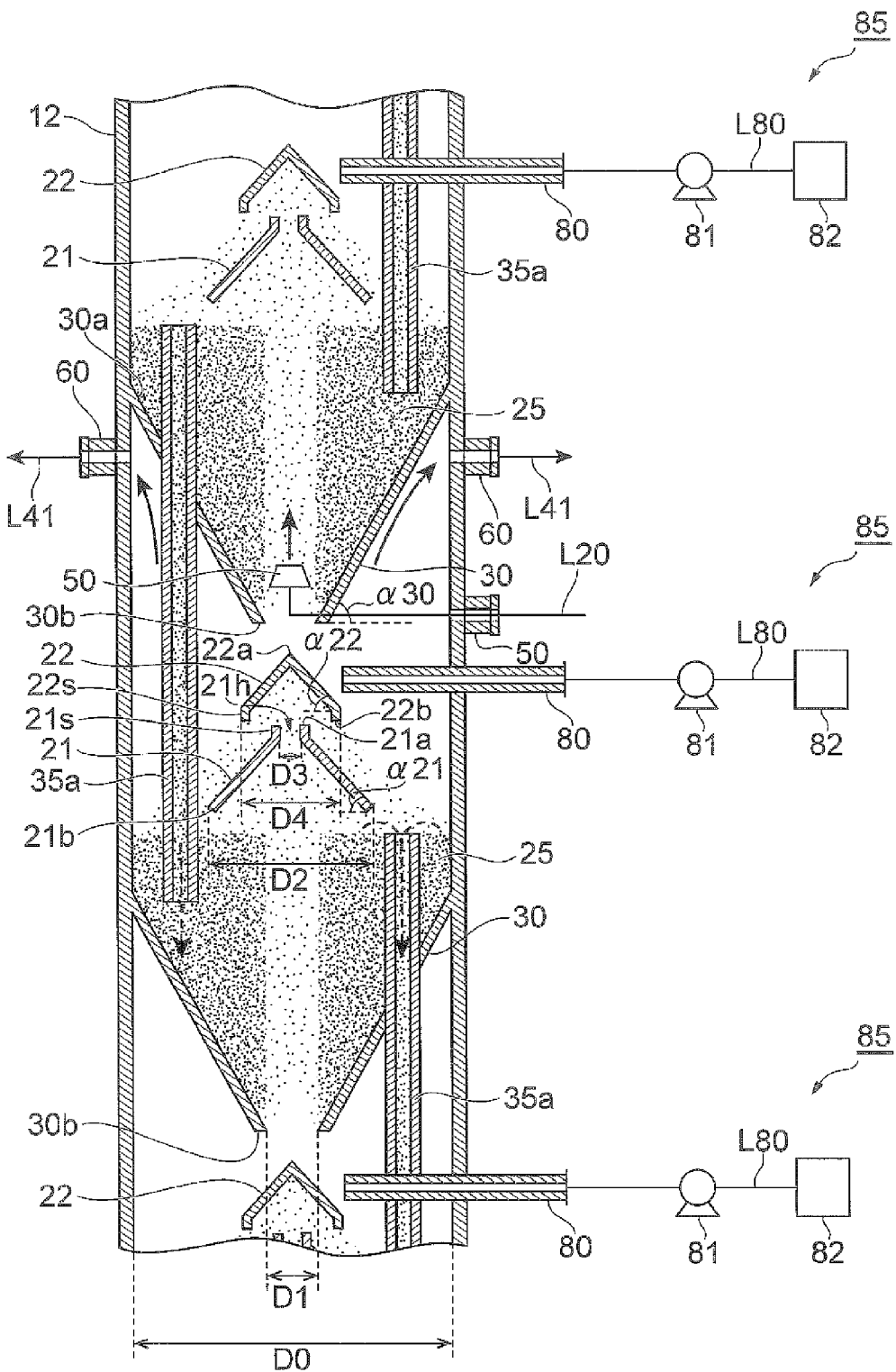
FIG. 4 is a schematic configuration diagram illustrating a further embodiment of the polyolefin production system according to the present invention.

For example, as shown in FIG. 4, a straight pipe 21s that extends upward in the vertical direction may be provided at the top end of the lower deflector 21. Furthermore, a straight pipe 22s that extends downwardly in the vertical direction may be provided at the bottom end of the upper deflector 22. Providing the straight pipe 21s and/or straight pipe 22s may more efficiently prevent particles from scattering upward. The lengths of these straight pipes 21s and 22s are preferably equal to or less than 2 times the outside diameter D4 of the lower deflector 21 at the bottom end in order to reduce pressure loss of the gas.

As shown in FIG. 2, the cylinder 12 includes a liquid olefin supply section 85 that causes liquid olefin to come into contact with the outer surface (top surface) of the upper deflector 22. The liquid olefin supply section 85 includes a nozzle 80 that is open toward the outer surface (top surface) of the upper deflector 22. A line L8 including a pump 81 is connected to the nozzle 80 and a liquid olefin supply source 82 is connected to this line L80.

The liquid olefin supplied from the liquid olefin supply section 85 prevents adhesion of particles to the outer surface (top surface) of the upper deflector 22. Since the area of the outer surface (top surface) of the upper deflector 22 is smaller than the area of the outer surface (top surface) of the lower deflector 21, the amount of liquid olefin supplied is not so large.

Instead of providing the liquid olefin supply section, it is also possible to prevent adhesion of particles to the outer surface (top surface) of the upper deflector 22 by applying mirror finish to the outer surface (top surface) of the upper deflector 22 or coating it with fluorine resin or the like.

Moreover, the outer surface (top surface) of the lower deflector 21 may also be subjected to mirror finish or fluorine resin coating. Examples of fluorine resin for this purpose include polytetrafluoroethylene and poly(difluoromethylene).

As shown in FIG. 1, the four cylindrical baffles 30 provided in the cylinder 12 are each provided with a down corner pipe 35a that penetrates each cylindrical baffle 30 and the lowest cylindrical baffle 30 is provided with a down corner pipe 35b. The down corner pipe 35a causes polyolefin particles to descend from an upper reaction region 25 to a lower reaction region 25. The down comer pipe 35b is intended to extract polyolefin particles from the lowest reaction region and discharge it to outside the cylinder 12. Two valves V71 and V72 are connected in series to this down corner pipe 35*b*, and it is possible to discharge polyolefin particles to the next process by successively opening/closing these valves.

The cylindrical baffle 30 preferably satisfies the following conditions in order for each reaction region 25 to form a stable spouted bed. That is, in the cylindrical baffle 30, the ratio (D1/d0) of the inside diameter D1 of the gas introducing orifice 30*o* of the cylindrical baffle 30 at the bottom end 30*b* to the inside diameter d0 of the cylinder 12 is preferably equal to or less than 0.35. Moreover, the angle of inclination α30 of the cylindrical baffle 30 in FIG. 2, that is, the angle formed by the inner surface of the cylindrical baffle 30 with respect to the horizontal plane is preferably equal to or greater than the angle of repose of polyolefin particles existing in the cylinder 12, and the angle of inclination α30 is preferably equal to or greater than the angle of repose and equal to or greater than an angle at which the total quantity of polyolefin particles can be naturally discharged by gravity. Smooth downwardly movement of polyolefin particles is attained in this way.

Angles of inclination α21 and α22 of the lower deflector 21 and the upper deflector 22 in FIG. 2, that is, angles formed by the outer surfaces of the lower deflector 21 and the upper deflector 22 with respect to the horizontal plane are preferably equal to or greater than the angle of repose of polyolefin particles existing in the cylinder 12. It is thereby possible to sufficiently prevent polyolefin particles from adhering to each deflector 21, 22.

The angle of repose of polyolefin particles is, for example, on the order of 35 to 50° and the angles of inclination α30 and α20 are preferably set to 55° or above.

The deflectors 21, 22 and the cylindrical baffle 30 are fixed to the cylinder 12 by supports (not shown) respectively and there is little influence of the supports on the gas flow or polyolefin flow. For the cylinder 12, each deflector 21, 22, and the cylindrical baffle 30, materials such as carbon steel, SUS304 and SUS316L may be used. Note that SUS is a stainless steel standard defined in JIS (Japanese Industrial Standard). SUS316L is preferably used in cases where catalysts containing a high proportion of corrosive component (e.g., halogen component such as chlorine) are used.

As shown in FIG. 1, a gas supply nozzle 40 is provided at the bottom of the cylinder 12, and a gaseous olefin monomer is supplied to the bottom of the cylinder 12 via a line L30 and a compressor 54. On the other hand, a gas discharge nozzle 61 is provided at the top of the cylinder 12. The gas ascending through the cylinder 12 is discharged to the outside via a line L40, gas entraining particles are discharged by a cyclone 62 which is installed as required. The gas undergoes processing in a heat exchanger 63, a compressor 64, a heat exchanger 65 and a gas/liquid separator 66, is then introduced into the line L30 via a line L35 and is recycled. In addition to the gas supply nozzle 40, a discharge nozzle (not shown) capable of discharging polyolefin particles at the end of operation may be provided at the bottom of the cylinder 12. Note that a reverse-conical content (not shown) may be placed at a position not blocking the gas flow at the bottom of the cylinder 12 for the purpose of reducing the amount of remaining powdered substance in the olefin polymerization reactor 10A at the end of operation.

The cylinder 12 is provided with a liquid supply nozzle 50 that supplies the liquid olefin separated by the gas/liquid separator 66 from outside the cylinder 12 into a predetermined reaction region 25. More specifically, the liquid supply nozzle 50 is placed in the vicinity of the gas introducing orifice 30*o* of the second-stage cylindrical baffle 30 from the top as shown in FIG. 1, configured to jet the liquid olefin toward the spout. A pump 52 and a line L20 that supply a liquefied olefin monomer as required are connected to the liquid supply nozzle 50. In FIG. 1, although the liquid supply nozzle 50 is placed in the vicinity of the gas introducing orifice 30*o* of the cylindrical baffle 30, the position of the liquid supply nozzle 50 is not limited to this, and, for example, the liquid supply nozzle 50 may be placed in the vicinity of the bottom end of the lower deflector 21. Note that the liquid supply nozzle 50 is preferably placed in a region where a high gas flow exists such as a spouted portion in which a spout is formed.

A plurality of gas discharge nozzles 60 are provided at parts facing the outer surface of the cylindrical baffle 30 in the cylinder 12. More specifically, as shown in FIG. 1, the gas discharge nozzles 60 are provided at parts facing the outer surface of the second-stage cylindrical baffle 30 from the top. This gas discharge nozzle 60 is connected to the line L40 via a line L41. The amount of gas discharged from the gas discharge nozzle 60 is controlled by a valve or the like so as to be substantially equal to the amount of gas supplied and gasified from the liquid supply nozzle 50. Therefore, even when a liquefied olefin monomer is supplied from the liquid supply nozzle 50 into the cylinder 12, a gas superficial velocity in the cylinder 12 is kept substantially constant in the vertical direction.

A line L5 is connected at a position higher than the top cylindrical baffle 30 in the cylinder 12 and polyolefin particles containing olefin polymerization catalyst solid particles are supplied to the top reaction region 25.

In this way, the present embodiment realizes polymerization steps in two stages through the olefin pre-polymerization reactor 5 and the olefin polymerization reactor 10A. Thus, olefin is polymerized by the olefin pre-polymerization reactor 5 and polyolefin particles are made to grow into relatively large polyolefin particles, having a particle size of preferably 500 µm or greater, more preferably 700 µm or greater, and particularly preferably 850 µm or greater, thus making it possible to form a more stable spouted bed. However, it is also possible to provide one-stage polymerization step without using any olefin pre-polymerization reactor 5. In this case, an olefin polymerization catalyst or preliminary polymerization catalyst is directly supplied to the olefin polymerization reactor 10A to polymerize olefin. Moreover, one or a plurality of additional olefin polymerization reactors such as the olefin pre-polymerization reactor 5 or olefin polymerization reactor 10A may be added to the downstream of the olefin polymerization reactor 10A to realize three or more polymerization steps.

(Olefin, Polyolefin, Catalyst or the Like)

Next, the olefin, polyolefin, catalyst or the like in such a system will be described in detail.

In the olefin polymerization reactor, process for producing polyolefin, and polyolefin production system of the present invention, olefin is polymerized (homopolymerization, copolymerization) to produce polyolefin, that is, an olefin polymer (olefin homopolymer, olefin copolymer). The above-described olefin used in the present invention is monoolefin and examples thereof include ethylene, propylene, 1-butene, 1-pentene, 4-methyl-1-pentene, 5-methyl-1-hexene, 1-hexene, 1-heptene, and 1-octene.

One or more types of such olefin are used and the type of olefin to be used may be changed in each polymerization step, and when a multi-stage polymerization method is used, the type of olefin to be used may be changed in each stage. Examples of combination of olefins when two or more types of olefin are used include propylene/ethylene, propylene/1- butene, propylene/ethylene/1-butene, ethylene/1-butene, ethylene/1-hexene, ethylene/1-octene. In addition to olefin, a polymerizable monomer other than monoolefin such as diene may also be used in combination.

The present invention can suitably produce an olefin polymer (homopolymer, copolymer) such as propylene homopolymer, propylene/ethylene copolymer, propylene/1-butene copolymer, propylene/ethylene/1-butene copolymer. The present invention is particularly suitable for use in producing an olefin-based polymer obtained through multi-stage polymerization in which content percentage of each monomer unit constituting a polymer component differs from one another, and it is possible to form homopolymer particles by supplying one type of olefin using, for example, the olefin pre-polymerization reactor 5 and the olefin polymerization reactor 10A or form random copolymer particles obtained by copolymerizing the olefin and a small amount of another type of olefin, and further supply two or more types of olefin to these polymer particles using an additional olefin polymerization reactor such as the pre-polymerization reactor 5 or olefin polymerization reactor 10A connected downstream thereof to generate a multi-stage polymerized olefin-based copolymer. This narrows a retention time distribution in the olefin polymerization reactor 10A, thereby makes it easier to stabilize the composition ratio in polymer particles, which is particularly effective in reducing defects during molding.

Examples of the polymer include propylene-propylene.ethylene polymer, propylene-propylene.ethylene-propylene.ethylene polymer, propylene.ethylene-propylene-ethylene polymer, propylene-propylene.ethylene.1-butene polymer. Here, "-" indicates a boundary between polymers and "." indicates that two or more types of olefin are copolymerized in the polymer. Among them, the present invention is particularly suitable for use in producing a multi-stage polymerized propylene-based copolymer which is a polymer containing propylene-based monomer units, called "high-impact polypropylene" (customarily also called "polypropylene block copolymer" in Japan) containing a crystalline propylene-based polymerized portion and amorphous propylene-based polymerized portion. The multi-stage polymerized propylene-based copolymer is obtained by polymerizing in multiple stages, a crystalline homopolypropylene portion or random copolymer portion in which a small amount of olefin other than propylene are copolymerized, and an amorphous rubber portion in which ethylene and propylene, and an olefin as an optional component other than ethylene and propylene are copolymerized, continuously in arbitrary order in the presence of their respective polymers, whose limiting viscosity measured in 1, 2, 3, 4-tetrahydronaphthalene at 135° C. preferably falls within a range of 0.1 to 100 dl/g. Since this multi-stage polymerized propylene-based copolymer has excellent heat resistance, rigidity and shock resistance, it can be used for automobile parts such as bumper and door trim, a variety of packaging containers such as retort pouch food packaging containers.

Using the olefin polymerization reactor and the process for producing polyolefin of the present invention, olefin polymer components having different molecular weights may be produced in respective polymerization steps to widen a molecular weight distribution of the olefin polymer. The present invention is also suitable for use in producing an olefin polymer having a wide molecular weight distribution, and can suitably produce an olefin polymer whose limiting viscosity obtained in the above measurement of a polymer component produced, for example, in a polymerization step of producing a polymer component having the largest molecular weight falls within a range of preferably 0.5 to 100 dl/g, more preferably 1 to 50 dl/g and particularly preferably 2 to 20 dl/g, the limiting viscosity being equal to or more than 5 times limiting viscosity of a polymer component produced in the polymerization step of producing a polymer component having the smallest molecular weight, and the amount of the polymer component produced in the polymerization step of producing the polymer component having the largest molecular weight being contained in the olefin polymer to account for 0.1 to 80 weight %.

As the olefin polymerization catalyst used for the present invention, a publicly known addition polymerization catalyst used for olefin polymerization can be used. Specific examples thereof include a Ziegler-based solid catalyst obtained by subjecting a solid catalyst component containing titanium, magnesium, a halogen and electron donor, an organic aluminum compound component, and an electron donor component in contact with each other; and a metallocene-based solid catalyst obtained by supporting a metallocene compound and a cocatalyst component on a particulate carrier. These catalysts may be used in combination. As such catalysts, catalysts and their processes for production described in Japanese Patent Application Laid-Open Publication No. 2009-161735 may be used.

A mass median particle size of the olefin polymerization catalyst is normally 5 to 150 µm. A mass median particle size of 10 µm or more is preferably used and that of 15 µm or more is more preferably used from the standpoint of preventing scattering of particles to outside the apparatus in a vapor phase polymerization reactor in particular. Note that the polymerization catalyst of the present embodiment may include an additive such as a fluidization assistant or static electricity elimination additive. For the polymerization catalyst of the present embodiment, a chain-transfer agent such as hydrogen may also be used in combination to adjust the molecular weight of the polymer.

The above-described olefin polymerization catalyst may be a so-called preliminary polymerization catalyst polymerized beforehand with a small amount of olefin. Examples of the olefin used for preliminary polymerization include the olefin used for the aforementioned polymerization. In this case, one type of olefin may be used singly or two or more types of olefin may be used in combination.

Examples of the process for producing a preliminary polymerization catalyst include slurry polymerization, vapor phase polymerization. Among them, slurry polymerization is used preferably. In this case, the production may be economically more advantageous. Production may be performed using any one of batch type, semi-batch type and continuous type.

A mass median particle size of the preliminary polymerization catalyst is normally 5 to 1000 µm. For a vapor phase polymerization reactor in particular, a mass median particle size of 10 µm or more is preferably used and that of 15 µm or more is more preferably used from the standpoint of preventing scattering to outside the apparatus. It is preferable to use a smaller amount of the preliminary polymerization catalyst having a particle size of 20 µm or less, and 10 µm or less in particular.

Note that the polymerization catalyst may be introduced into the polymerization reactor by causing the polymerization catalyst to be suspended in a carbon hydride solvent or the like or further introduced by causing it to be accompanied by a monomer gas or an inert gas such as nitrogen.

(Process for Producing Polyolefin)

Next, a process for producing polyolefin using such a system will be described. First, polyolefin particles containing a polymerization-active catalyst component are generated by the olefin pre-polymerization reactor 5 using a publicly known method and using an olefin polymerization catalyst.

On the other hand, in the olefin polymerization reactor 10A, an olefin monomer gas is supplied from the nozzle 40 via the line L30, the pressure thereof is increased to a polymerization pressure and the interior of the cylinder 12 is heated. The polymerization pressure may fall within a range in which olefin can exist in a vapor phase within the polymerization reactor, may be ambient pressure to 10 MPaG, more preferably 0.2 to 8 MPaG, and further preferably 0.5 to 5 MPaG from the standpoint of productivity. The polymerization temperature may differ depending on the type of monomer, molecular weight of the product or the like, and is equal to or lower than a melting point of the olefin polymer, and may be preferably by at least 10° C. lower than the melting point. More specifically, it is preferably 0 to 120° C., more preferably 20 to 100° C. and further preferably 40 to 100° C. Polymerization is preferably performed in an environment with substantially no water content in order to improve polymerization activity of the polymerization catalyst. When oxygen, carbon monoxide, or carbon dioxide exists excessively in the polymerization reaction system, the polymerization activity thereof may deteriorate.

After that, polyolefin particles having a particle size on the order of 0.5 to 5.0 mm separately obtained using a publicly known method are supplied into the cylinder 12 via a supply line (not shown) connected to the line L5. Polyolefin particles supplied into the cylinder 12 may often contain no polymerization-active catalyst component, but the polyolefin particles may also contain a polymerization-active catalyst component.

When polyolefin particles are supplied into the cylinder 12 while supplying an olefin monomer gas from the nozzle 40, a spouted bed of polyolefin particles is formed in the reaction region 25 as shown in FIG. 2. That is, through the action of the gas from the gas introducing orifice 30o, a spout is formed in the vicinity of the central axis of the cylinder 12 in the reaction region 25 where the concentration of particles is sparse and an upward flow of particles is formed together with this gas, while an annular structure is formed therearound in which particles descend in a moving bed form under the influence of gravity, and this results in a formation of, producing circular motion of particles within the reaction region 25.

In a stage in which a spouted bed is formed in each reaction region 25, polyolefin particles containing a polymerization-active catalyst component generated in the pre-polymerization reactor 5 are supplied in a constant amount per unit time from the line L5 into the cylinder 12 to start steady operation of the olefin polymerization reactor 10A. Polyolefin particles containing the polymerization-active catalyst component sequentially descend through the down corner pipe 35a into the lower reaction region 25 while growing in each reaction region 25 and are finally discharged from the down corner pipe 35b.

On the other hand, part of the gas containing olefin monomer forms a spout and passes through the particle bed, and the rest of the gas scatters over the particle bed portion of the annular structure. Thus, the olefin-containing gas and polyolefin particles come into solid/gas contact with each other, olefin polymerization reaction advances due to action of the catalyst in polyolefin particles, causing polyolefin particles to grow.

In order to form a stable spouted bed in each reaction region 25, the following operation condition is preferably satisfied. That is, that a gas superficial velocity $U_0$ should be a minimum gas superficial velocity Ums or above at which a spouted bed can be formed. The minimum gas superficial velocity Ums is influenced by the shape of the polymerization reactor in addition to physical properties of the powder or gas handled. Various types of estimation equation are proposed to calculate the minimum gas superficial velocity Ums and an example thereof includes equation (1) below.

[Equation 1]

$$Ums = \frac{d_P}{d_B}\left(\frac{d_A}{d_B}\right)^{1/3} \sqrt{\frac{2gL_S(\rho_S - \rho_G)}{\rho_G}} \times \left(\frac{\rho_G}{\rho_{AIR}}\right)^{0.2} \quad (1)$$

In the equation, reference character $d_P$ denotes a particle size, $\rho_S$ denotes a density of particles, $\rho_G$ denotes a density of gas under the pressure and temperature condition of the reaction region, $\rho_{AIR}$ denotes a density of air under the room temperature condition, and $L_S$ denotes a height of the spouted bed.

A spouted bed height $L_s$ in the reaction region 25 is equal to or less than a maximum spouted bed height $Ls_{MAX}$ m within which a spouted bed can be formed, and there is no particular limitation if it is equal to or less than a maximum spouted bed height $Ls_{MAX}$. Various estimation equations are proposed for the maximum spouted bed height $Ls_{MAX}$, and an example thereof includes equation (2) below.

[Equation 2]

$$\frac{Ls_{MAX}}{d_B} = \frac{d_B}{d_A}\left\{0.218 + \frac{0.005(\rho_S - \rho_G)gd_A}{\rho_G u_t u_{mf}}\right\} \quad (2)$$

The spouted bed height $L_S$ is preferably higher than the cylindrical baffle 30 from the standpoint of volume efficiency and forming a more stable spouted bed.

As shown in FIG. 1, all or part of the olefin-containing gas extracted from the olefin polymerization reactor may be condensed to obtain a condensate and the condensate may be supplied from the middle-stage nozzle 50 of the cylinder 12 to the cylinder 12. In this case, it is possible to make replenishment of the olefin monomer consumed in the polymerization reaction. In addition, when the liquid olefin monomer is evaporated in the cylinder 12, heat of polyolefin particles can also be removed by evaporative latent heat. Among the plurality of reaction regions 25 in the cylinder 12, the higher the location of the reaction region 25, the higher the temperature is likely to become by reaction heat, producing a temperature difference from the lower reaction region 25. Thus, by supplying a liquid olefin monomer from the nozzle 50 provided in the middle stage of the cylinder 12, it is possible to control the temperature difference to a minimum and to uniformalize the temperature.

According to the olefin polymerization reactor 10A according to the present embodiment, a multi-stage spouted bed is formed in the cylinder 12 making it possible to narrow a retention time distribution of particles. Therefore, when continuously producing an olefin polymer, it is possible to produce one with excellent uniformity in the polymer structure. When the production condition is changed, it is possible to easily discharge polyolefin particles polymerized before changing the condition from within the container and thereby sufficiently reduce the amount of non-standard products.

Particularly according to the present embodiment, since the upper deflector 22 and the lower deflector 21 are provided, it is possible to efficiently cause particles coming out of the spouted bed to return to the spouted bed, easily improve uniformity of the retention time distribution of particles, and further prevent adhesion or deposition of particles to the outer surface (top surface) of the lower deflector 21 by particles jetting out from between the lower deflector 21 and the upper deflector 22.

Note that the present invention is not limited to the above embodiment. For example, although a case has been illustrated in the above embodiment where the down corner pipe 35a is used as transporting means for transporting polyolefin particles from the reaction region on the upstream side to the reaction region on the downstream side, polyolefin particles may be transported using an ejector scheme instead. Moreover, transporting means called a double dumper or double bubble system for transporting powder by providing two opening/closing valves placed apart from each other in the channel may be used.

The above embodiment has illustrated an olefin polymerization reactor in which five-stage spouted beds are formed in the vertical direction, but the number of stages of the spouted beds is not limited to this, and the number of stages can be singular. The number of stages of the spouted beds is preferably three or more, and more preferably six or more from the standpoint of realizing a sufficient plug flow. In the above embodiment, each combination of part of the cylinder (tubular portion) 12, cylindrical baffle 30, lower deflector 21, and upper deflector 22 corresponds to one stage of spouted bed.

Furthermore, the multi-stage spouted beds need not always be formed in the vertical direction, and it is also possible to install a plurality of polymerization reactors in each of which a single-stage spouted bed is formed in the horizontal direction and connect these polymerization reactors in series. Regarding the apparatus design and operation control method, it is preferable to design a capacity of each stage of the apparatus so that the amount of polyolefin generated in each stage (including the olefin pre-polymerization reactor 5) becomes more uniform so as to narrow the retention time distribution of polyolefin particles and control the hold-up of polyolefin particles and the retention time.

A case has been illustrated in the above embodiment where the liquid supply nozzle 50 is placed in the vicinity of the gas introducing orifice 30o of the second-stage cylindrical baffle 30 from the top, but the locations and the number of the liquid supply nozzles 50 may be set as appropriate according to the type of polyolefin particles produced or the like. For example, if the temperature of each reaction region 25 can be uniformalized by other means, the liquid supply nozzle 50 need not always be placed, and the liquid supply nozzles 50 may be placed in the vicinity of the gas introducing orifices 30o of all the cylindrical baffles 30 respectively.

In the above embodiment, the cylinder 12 is used as the tubular portion, but the present invention can also be implemented using a square tube or the like.

EXAMPLES

Example 1

In order to observe a situation in which particles adhere to the upper deflector 22 and the lower deflector 21 of the olefin polymerization reactor according to the present invention, a cylindrical cold model apparatus made of transparent vinyl chloride resin was prepared in which one-stage spouted bed could be formed in the cylinder 12. This apparatus includes the reverse-conical cylindrical baffle 30 having the gas introducing orifice 30o, and the lower deflector 21 and the upper deflector 22 provided thereabove, all of which are coaxially arranged in the cylinder 12.

The inside diameter D0 of the cylinder cold apparatus was 500 mm, the diameter D1 of the gas introducing orifice at the cylindrical baffle bottom end was 75 mm. Therefore, in the present example, the ratio (D1/D0) of the diameter D1 of the gas introducing orifice to the inside diameter D0 of the cylinder was 0.15.

The angle of inclination formed by the inner surface of the cylindrical baffle with respect to the horizontal plane and the angle of inclination formed by the outer surfaces of the upper and lower deflectors with respect to the horizontal plane were all assumed to be 65°. The lower deflector 21 had a shape of tapered tube which becomes thinner upward, and had an orifice in the axial center. The outside diameter D3 of the orifice was 264 mm and the outside diameter D2 of the lower deflector at the bottom end was 264 mm. The upper deflector 22 has a hollow conical shape, a bottom end of which was open and a top end of which was closed. The outside diameter D4 at the bottom end was 142 mm. Moreover, the bottom end of the lower deflector 21 was located 400 mm above the top end of the cylindrical baffle 30 in the vertical direction, and as shown in FIG. 3, the bottom end 22b of the upper deflector 22 was located below the top end 21a of the lower deflector 21 and the shortest distance between the lower deflector 21 and the upper deflector 22 was 15 mm.

Air at 5 to 15° C. with a relative humidity of less than 50% was supplied from the aforementioned gas introducing orifice of the cylindrical baffle at 6.1 $m^3$ per minute. As particles, polypropylene particles having a mean particle size of 965 μm were used (volume-based 50% diameter measured using a laser diffraction particle size analyzer HELOS&RODOS manufactured by Sympatec GmbH was assumed as the mean particle size). The reaction region 25 was charged with 30 kg of polypropylene particles, the gas of the above-described flow rate was supplied from the gas introducing orifice 30o of the cylindrical baffle 30 and a spouted bed was thereby formed in the reaction region 25.

The fluidization state of the spouted bed was observed from outside. Some particles coming out of the spouted bed were rebounded from the undersurface of the lower deflector 21 to return to the spouted bed, some other particles passed through the orifice of the lower deflector 21, were rebounded from the undersurface of the upper deflector 22 and ran down along the outer surface (top surface) of the lower deflector 21. Adhesion of particles to the lower deflector 21 was not observed even 10 minutes after the formation of the spouted bed was started. This suggested that particles rebounded from the inner surface (undersurface) of the upper deflector 22 might have flown along the outer surface (top surface) of the lower deflector 21 to thereby exert a cleaning effect. Only minor adhesion due to static electricity was observed on the outer surface (top surface) of the upper deflector 22.

Example 2

As shown in FIG. 2, the same conditions as those of example 1 were used except in that the bottom end 22b of the upper deflector 22 was located above the top end 21a of the lower deflector 21 and the distance between the bottom end 22b of the upper deflector 22 and the top end 21a of the lower deflector 21 in the vertical direction was set to be 60 mm. Adhesion of particles to the outer surface (top surface) of the upper deflector and the outer surface (top surface) of the lower deflector was not observed 10 minutes after the formation of the spouted bed was started.

Example 3

Differences from example 2 are that an upward extending straight pipe 21s was provided at the top end of the lower deflector 21 as shown in FIG. 4 and that the distance between the bottom end of the upper deflector 22 and the top end of the straight pipe 21s in the vertical direction was set to be 65 mm. The length of the straight pipe 21s was 75 mm. Adhesion of particles to the outer surface (top surface) of the upper deflector and the outer surface (top surface) of the lower deflector was not observed 10 minutes after the formation of the spouted bed was started.

Comparative Example 1

The same conditions as those of example 1 were used except in that no upper deflector 22 was used and instead of the tapered tube shape, the lower deflector 21 had a hollow conical shape, only the bottom end of which was open. Adhesion of a considerable amount of particles to the whole outer surface (top surface) of the lower deflector due to static electricity was observed 10 minutes after the formation of the spouted bed was started.

REFERENCE SIGNS LIST 10A, 10B, 10C . . . olefin polymerization reactor, 12 . . . cylinder (tubular portion), 20 . . . deflector, 25 . . . reaction region, 30 . . . cylindrical baffle (tapered portion), L31 . . . particle extraction tube (transporting means), 32 . . . ejector (transporting means), L33 . . . particle supply tube (transporting means), 35a, 35b . . . down corner pipe (transporting means), L38 . . . gas supply tube, 80 . . . opening/closing valve, 100A, 100B, 100C . . . polyolefin production system

The invention claimed is:
1. An olefin polymerization reactor comprising:
a tubular portion that extends in a vertical direction;
a tapered portion disposed inside the tubular portion, an inside diameter of the tapered portion decreasing downwardly, and comprising a vertically penetrating orifice at a bottom end thereof;
a tubular lower deflector disposed above the orifice of the tapered portion, an outside diameter of the tubular lower deflector increasing downwardly and a bottom end thereof being located away from an inner wall of the tubular portion, and comprising a vertically penetrating orifice at a top end thereof; and
an upper deflector disposed above the orifice of the lower deflector, an outside diameter of the upper deflector increasing downwardly, a top end thereof being closed, a bottom end thereof being located away from the inner wall of the tubular portion, and an outside diameter at the bottom end being equal to or greater than an inside diameter of the orifice of the lower deflector,
wherein the area of the outer surface of the upper deflector is smaller than the area of the outer surface of the lower deflector.

2. The polymerization reactor according to claim 1, wherein the bottom end of the upper deflector is located below the top end of the lower deflector.
3. The polymerization reactor according to claim 1, wherein the bottom end of the upper deflector is located above the top end of the lower deflector.
4. The polymerization reactor according to claim 1, wherein the inside diameter of the orifice of the lower deflector is 0.5 to 2.0 times the inside diameter of the orifice of the tapered portion.
5. The polymerization reactor according to claim 1, wherein the outside diameter of the upper deflector at the bottom end is equal to or less than 3 times the inside diameter of the orifice of the lower deflector.
6. The polymerization reactor according to claim 1, wherein the outside diameter of the lower deflector at the bottom end is 0.35 to 0.65 times the inside diameter of the tubular portion.
7. The polymerization reactor according to claim 1, further comprising a liquid olefin supply section that causes liquid olefin to contact the outer surface of the upper deflector.
8. The polymerization reactor according to claim 1, comprising a plurality of combinations of the tubular portion, the tapered portion, the lower deflector and the upper deflector.
9. The polymerization reactor according to claim 8, wherein the plurality of combinations are arranged in the vertical direction.
10. The polymerization reactor according to claim 8, further comprising transporting means for transporting polyolefin particles from one of the combinations to another of the combinations.
11. The polymerization reactor according to claim 1, wherein an angle of inclination formed by the outer surface of the lower deflector with respect to a horizontal plane is greater than an angle of repose of polyolefin particles in the cylinder.
12. The polymerization reactor according to claim 1, wherein an angle of inclination formed by the outer surface of the upper deflector with respect to a horizontal plane is greater than an angle of repose of polyolefin particles in the cylinder.
13. The polymerization reactor according to claim 1, wherein the outer surface of the upper deflector is a conical surface.
14. The polymerization reactor according to claim 1, wherein the outer surface of the lower deflector forms part of a conical surface.
15. The polymerization reactor according to claim 1, comprising a straight pipe that extends upward in the vertical direction at the top end of the lower deflector.
16. The polymerization reactor according to claim 1, comprising a straight pipe that extends downward in the vertical direction at the bottom end of the upper deflector.
17. A process for producing polyolefin in which a spouted bed of polyolefin particles is formed on the tapered portion in the polymerization reactor according to claim 1 to polymerize olefin, wherein the spouted bed is formed such that the whole lower deflector is exposed above the top surface of the spouted bed.
18. A process for producing polyolefin according to claim 17, further comprising:
a step of continuously supplying olefin to the olefin polymerization reactor, continuously extracting a gas containing unreacted olefin from the olefin polymerization reactor and sending all or part of the extracted gas back to the olefin polymerization reactor;

a step of cooling the whole or part of the extracted gas and obtaining an olefin-containing condensate; and a step of supplying the condensate to the outer surface of the upper deflector.

19. A polyolefin production system used in the process according to claim 17, comprising:

an olefin pre-polymerization reactor that polymerizes olefin in the presence of an olefin polymerization catalyst and forms polyolefin particles; and the olefin polymerization reactor connected downstream of the olefin pre-polymerization reactor.

20. A process for producing polyolefin in which olefin is polymerized using the polyolefin production system according to claim 19.

* * * * *